United States Patent [19]

Naidich et al.

[11] 4,117,968

[45] Oct. 3, 1978

[54] METHOD FOR SOLDERING METALS WITH SUPERHARD MAN-MADE MATERIALS

[76] Inventors: Jury Vladimirovich Naidich, ulitsa Vernadskogo, 85, kv. 48; Galina Alexeevna Kolesnichenko, ultisa Prazhskaya, 3, kv. 128; Nikolai Stepanovich Zjukin, ulitsa Kurskaya, 8a, kv. 59; Boris Dmitrievich Kostjuk, ulitsa Marshala Malinovskogo, 3a, kv. 206; Stanislava Stanislavovna Shaikevich, ulitsa Volodarskogo, 69, kv. 7; Yaroslav Feodosievich Motsak, ulitsa Dorogozhitskogo, 26, kv. 7, all of Kiev; Vitaly Pavlovich Fedulaev, stantsia Ukhtomskaya, ulitsa N.Tupik, 5, Moskovskaya oblast, Ljuberetsky raion; Nikolai Alexandrovich Kolchemanov, ulitsa Moskovskaya, 33; Valentin Mikhailovich Ugarov, Oktyabrsky prospekt, 263, kv. 3, both of Ljubertsy Moskovskoi oblasti; Viktor Vasilievich Losev, ulitsa Planernaya, 5, korpus 1, kv. 174, Moscow; Mark Simonovich Drui, ulitsa Chekhova, 4, kv. 93, Leningrad; Alla Alexandrovna Lavrinovich, ulitsa Shvernika, 16, kv. 51, Leningrad; Dmitry Fedorovich Shpotakovsky, ulitsa Shvernika, 16, kv. 50, Leningrad; Stanislav Viktorovich Chizhov, prospekt Morisa Toreza, 13, kv. 28, Leningrad, all of U.S.S.R.

[21] Appl. No.: 610,225

[22] Filed: Sep. 4, 1975

[51] Int. Cl.² .................. B23K 1/20; C04B 31/16; C04B 41/38
[52] U.S. Cl. .................. 228/124; 51/309 R; 76/DIG. 12; 228/263; 427/217; 427/404
[58] Field of Search ............. 228/122, 123, 124, 263, 228/239, 903; 76/DIG. 12; 51/309 R; 427/404, 431, 217

[56] References Cited

U.S. PATENT DOCUMENTS

| | | | |
|---|---|---|---|
| 2,570,248 | 10/1951 | Kelley | 51/309 X |
| 3,006,069 | 10/1961 | Rhoads et al. | 228/124 |
| 3,178,273 | 4/1965 | Libal | 51/309 X |
| 3,293,012 | 12/1966 | Smiley et al. | 51/309 X |
| 3,356,473 | 12/1967 | Hull et al. | 51/309 |
| 3,417,460 | 12/1968 | Galmiche | 228/263 X |
| 3,548,345 | 12/1970 | Falce | 228/122 X |
| 3,650,714 | 3/1972 | Farkas | 51/309 X |
| 3,793,705 | 2/1974 | Cole et al. | 228/124 |
| 3,795,041 | 3/1974 | Hennicke et al. | 228/263 X |
| 3,868,234 | 2/1975 | Fontanella | 51/309 |
| 3,894,673 | 7/1975 | Lowder | 228/122 |

*Primary Examiner*—Al Lawrence Smith
*Assistant Examiner*—K. J. Ramsey
*Attorney, Agent, or Firm*—Lackenbach, Lilling & Siegel

[57] ABSTRACT

This invention relates to methods for soldering metals to superhard man-made materials such as diamond, boron nitride and hexanite and to soldering agents therefore. A method is proposed which comprises applying a metallizing coating to the soldering surface of the materials based on diamond and/or boron nitride, the materials to be joined by soldering being exposed to a temperature sufficient to bring about adequate adhesion of the metallizing coating to the materials to be soldered, and subsequently soldering the metal with the material bearing the metallized coating by use of soldering agents featuring ductile properties and melting points in the range up to 1,000° C, whereby, in accordance with the invention, the metallizing coating is constituted by metals showing high adhesive activity toward materials based on diamond and boron nitride and accounting for from 3.0 to 65 percent by weight of the coating and by metals showing poor oxidizability which account for the balance. The soldering procedure is effected in air under a layer of a liquid flux designed for soldering metals with metallic spelters. Also proposed is a copper-tin-titanium soldering agent which, in accordance with the invention, has the following composition, wt.%:

copper, from 15 to 60
 tin, from 5 to 15
 titanium, from 5 to 25
 lead, from 2 to 15, the balance being constituted by at least one metal from the group consisting of molybdenum, tungsten and tantalum. The proposed method and soldering agent, apart from conducting to very strong and stress-free soldered joints, also provides for a high level of reliabiity of soldered joints and an improved soldering efficiency.

10 Claims, No Drawings

METHOD FOR SOLDERING METALS WITH SUPERHARD MAN-MADE MATERIALS

The present invention relates to methods for soldering metals to superhard man-made materials and to soldering agents therefor.

The invention may be advantageously employed, inter alia, for soldering cutting members constructed from diamond-or boron nitride-base materials to a metal, for the purpose of manufacturing cutting and abrasive tools therefrom.

It is currently known in the art to employ a great range of novel superhard man-made materials based on diamond, boron nitride and the like which are used as the cutting elements of cutting and abrasive tools.

In view of the fact that, as distinct from natural diamonds, the novel superhard materials are characterized by a low hexagonal transition temperature, higher brittleness, lower strength, improved chemical stability and thermal expansion coefficients widely differing from those of the metals with which they are joined, novel methods of soldering and novel soldering agents most suitable thereto constitute an important challenge. Experience indicates that traditional methods and soldering agents for soldering and metallization fall short of meeting the requirements with the novel materials for manufacturing cutting and abrasive tools.

There exists a known method of pouring a liquid soldering agent into the slit between natural diamond and metal under vacuum at a temperature of from 900° to 1,100° C, the soldering agents being constituted by gold-tantalum, gold-niobium silver-copper-titanium, silver-titanium alloys as well as alloys containing aluminum and silicon.

The foregoing technique ensures adequate adhesive strenghth of the soldered joint.

It is likewise known in the art to press-fit diamond crystals into a copper-tin-titanium powder or into a copper-tin-chromium-tungsten alloy followed by liquid-phase sintering. This technique also conduces to satisfactory adhesive strength of the soldered joint.

However, the foregoing known soldering techniques have failed to find wide application for they induce thermal stresses in the joints which cause cracking in the bulk of particularly brittle superhard materials such as polycrystals of superhard materials on the basis of diamond or boron nitride. Furthermore, these methods involve the use of high-vacuum equipment which adversely affects their efficiency.

It is further known in the art to solder metals to superhard man-made materials by a technique whereby a metallizing coating of titanium and zirconium is applied to the soldering surface of said superhard materials, the procedure being effected under vacuum at a temperature sufficient to achieve adequate adhesion of the metallizing coating to diamond, and the materials thus coated are joined with metal under vacuum by use of a copper-silver brazing alloy at a temperature equal to the melting point of the soldering agent.

This latter method provides for strong, stress-relieved joints, since the brazing alloy used is a ductile material. However, its disadvantage lies in its unreliability due to the high susceptibility of the titanium-zirconium coating to oxidation, as often as not detracting from the joint quality (reduced adhesion). Furthermore, the efficiency of this technique is impaired by the need for high-vacuum apparatus.

The most popular brazing alloy employed for soldering and metallizing superhard man-made materials is based on the copper-tin-titanium combination displaying high adhesiveness towards said materials. The superhard man-made material employed in the foregoing prior art technique is based on diamond or boron nitride.

The above known soldering agent offers few advantages by virtue of its poor ductility, high brittleness and a thermal expansion coefficient differing from that of the novel superhard materials on the bases of diamond or boron nitride. Hence the thermal stresses in the soldering zone with the resultant massive cracking in the cutting element and also fast attrition of the tools.

It is a cardinal object of the invention to provide a method for soldering metals to superhard man-made materials as well as a soldering agent conducive to highly reliable and stress-free soldered joints.

It is a further object of the invention to provide a soldering method and a soldering agent conducive to an improved level of soldering efficiency.

These and other objects are attained by a method for soldering metals to diamond- and boron nitride-base materials whereby a metallizing coating is applied to the soldering surface of diamond- and boron-nitride-base materials at a temperature sufficient to achieve adequate adhesion of the metallizing coating to the materials to be soldered and the material thus coated is joined by soldering with metal by use of brazing alloys displaying ductile properties and melting points in the range up to 1,000° C. In accordance with the invention, the metallizing coating is constituted by metals showing high adhesive activity towards diamond- and boron nitride-base materials which account for 3.0 to 65.0 percent by weight of the coating, the balance being constituted by metals distinguished by virtue of poor oxidazability, and the soldering procedure is effected in air under a layer of a liquid flux specifically designed for soldering metals with metallic spelters.

The adhesively active metals selected for the metallized coating of diamond- and boron nitride-base materials ensure a high level of adhesion due to their chemical reaction with the diamond and boron nitride at temperatures from 800° to 1,000° C, while the metals nonadhesively active towards the diamond and boron nitride are chiefly responsible for protecting the highly adhesive metals against oxidation. The high adhesion of the metallizing coating to diamond- and boro nitride-base materials is attained through the choice of an optimal range of concentrations of the adhesive and oxidation-resistant metals.

To improve the efficiency of the process, it is carried out in air. To preserve the adhesiveness of the metallizing coating to diamond- and boron nitride-base materials, the soldering procedure is effected under layer of a liquid flux specifically designed for soldering metals with metallic spelters, with low melting points (between 500° and 700° C).

The metals showing high adhesive activity towards diamond- and boron nitride-base materials are preferably chromium and/or tungsten, molybdenum, tantalum or titanium, whereas the oxidation-resistant metals are preferably copper and/or silver, tin, lead, nickel or cobalt.

Of the above highly adhesive metals, titanium is the most adhesive; but since chromium, tungsten, molydbenum and tantalum combine high adhesiveness with a higher oxidation resistance than that of titanium, the latter metals are particularly effective.

Said metals further combine poor oxidizability with high ductility, an additional requisite for the proposed method, and adequate wettability by brazing alloys.

To assure adequate oxidation resistance of the metallizing coating and its solid bond with diamond- and boron nitride-base materials, the coating procedure is preferably carried out in two operational steps.

First, a coat of a hard metal is applied which shows high adhesiveness towards diamond- and boron nitride-base materials; at a temperature of from 800° to 1,000° C under vacuum the components of this coat react with the diamond- and boron nitride-base materials, providing for a high level of adhesion of the metallizing coating. The optimal layer thickness conducive to high adhesiveness of the coating lies between 0.0005 and 0.001 mm.

Then an additional coat of hard metal is applied which displays low oxidizability and thus protects the adhesive metal against oxidation. The latter layer further shows adequate wettability by traditional brazing alloys. The optimal thickness of this layer lies in the range from 0.001 to 0.01 mm.

An alternative and equally efficient method of applying a likewise highly adhesive and oxidation-resistant metallizing coating to diamond- and boron nitride-base materials consists of using a metal melt highly adhesive towards the materials being metallized. The adhesion is achieved through chemical adsorption of the adhesive component from the melt on the diamond- or boron nitride-base material and its reaction under vacuum (or in a protective atmosphere) at a temperature allowing chemical reaction, the metallizing coating being protected against oxidation by the external layer of the alloy. The optimal thickness of the metallizing coating lies between 0.01 and 0.5 mm.

Metallization of the diamond- or boron nitride-base material may be effected by any suitable technique: metal sputtering with electron-beam heating and deposition of the metal vapour on a relatively cold specimen (T = 200° to 500° C); electrolytic deposition of metals on the material being metalized and their subsequent baking to achieve a required degree of adhesion; dipping of the material in an adhesive melt; application of powder-like adhesive alloy pastes kneaded on the basis of a readily burning out organic glue and their subsequent heat treatment to achieve a strong bond between the metallizing layer and the surface, and like technique.

It has been noted that a high degree of adhesion of the coating to the surface of the material is a crucial factor in any metallization procedure; this requirement is met by employing metals adhesively active towards the diamond- and boron nitride-base materials and baking the metallized material under vacuum (argon, helium) at temperatures allowing chemical reactions at the diamond- or boron nitride- adhesive metal interface.

We can recommend, as the most preferable process, to perform soldering at the solder melting point for 0.5 to 2.0 minutes at a rate of heating and cooling of the surfaces being joined of from 10 to 30 deg/sec by use of a liquid flux designed for soldering metals with hard metallic solders and having a melting point of between 500° and 700° C.

At the foregoing process conditions, oxygen is effectively barred from the metallized surface of the diamond- or boron nitride-base materials at temperatures of 500° C (starting point of intensive oxidation of the coating and destruction of the adhesive bonds) and upwards.

The most popular flux has the following composition, wt.%:
boric anhydride, 35
anhydrous potassium fluoride, 42
potassium fluoborate, 23.

The above composition provides for a melting point of 500° C as well as for the permanence of the properties throughout the entire course of soldering.

The object of the invention is likewise attained by the provision of a soldering agent for soldering metal with diamond- and/or boron nitride-base materials, which comprises copper, tin and titanium in the following amounts, wt.%:
copper, from 13 to 60
tin, from 5 to 15
titanium, from 5 to 25,
and also, in accordance with the invention, from 2 to 15 percent lead by weight, the balance being constituted by molybdenum and/or tungsten, or tantalum.

The copper-tin-titanium-base soldering agents show melting points of up to 1,000° C, i.e. temperatures at which diamond and cubic boron nitride (wurtzite-structure type) start undergoing hexagonal transformations, and also high adhesive activity towards diamond- and boron nitride-base materials.

Added to these solder components, lead improves the fluidity and ductility of the alloy, while tungsten, molybdenum and tantalum lower its thermal expansion coefficient, bringing it closer to the thermal expansion coefficient of the diamond- and boron nitride-base materials. The tin to copper ratio is so selected as to be compatible with the desired strength and melting point of the solder.

A titanium level below 5 percent by weight causes a dramatic deterioration in adhesion, whereas more than 25 percent by weight of titanium entails undesirable embrittlement of the solder.

More than 15 percent by weight of lead is liable to markedly impair the strength of the alloy.

More than 40 percent by weight of molybdenum and/or tungsten or tantalum raises the melting point of the solder, which may lead to undesirable transitions of diamond and cubic (wurtzite-structure type) boron nitride to hexagonal modifications.

In order that the solder may have a thermal expansion coefficient close to that of diamond- and boron nitride-base materials, the solder incorporates from 0.5 to 20 percent by weight of a non-metallic filler at 0.3 to 20 percent by weight of molybdenum, tungsten or tantalum.

To raise the ductility of the solder, the non-metallic filler is a powder of preferable grain size from 1 to 50 microns.

Such a grain size of the non-metallic powder conduces to residual microporosity in the solder, contributing to its improved ductility.

The present invention is subsequently illustrated by a detailed description of an exemplary embodiment thereof.

According to the invention, there is provided a method for soldering metals to diamond- and boron nitride-base materials whereby a metallizing coating is applied to the soldering surface of the diamond- and boron nitride-base materials, with the materials to be joined being exposed to a temperature sufficient to achieve adequate adhesion of the metallizing coating to the materials, and the metal is joined with the metallized material by use of soldering agents exhibiting ductile properties and having melting points of up to 1,000° C. In accordance with the invention, the metallizing coating is constructed by metals showing high adhesiveness towards the diamond- and boron nitride-base materials, viz. chromium and/or molybdenum, tantalum, tungsten or titanium taken at the rate of from 3.0 to 65.0 percent by weight of the coating, the balance of the coating being accounted for by metals exhibiting improved oxidation resistance, viz. copper and/or silver, lead, tin, nickel or cobalt.

The application of said coating is effected in two operational steps: first, a coat of a hard metal showing high adhesive activity towards diamond- and boron nitride-base materials is built up to a thickness between 0.0005 and 0.001 mm, and then a coat of a hard metal exhibiting improved oxidation resistance is built up to a thickness between 0.001 and 0.01 mm.

An alternative technique of application of the metallizing coating uses a metal melt made up of metals highly adhesive towards diamond- and boron nitride-base materials and oxidation-resistant metals, the coating thickness being from 0.01 to 0.5 mm.

The soldering procedure is carried out at the solder melting point for 0.5 to 2 minutes at a rate of heating and cooling of the surfaces being joined, of from 10 to 30 deg/sec in air under a layer of a liquid flux. The liquid flux belongs to the category of fluxes employed for soldering metals by means of metallic spelters. The melting points of such fluxes lie within the range from 500° to 600° C and they further exhibit stability of properties in the temperature range up to 1,000° C.

An acceptable flux (Flux No. 1) may have the following composition, wt.%:
boric anhydride, 35
anhydrous potassium fluoride, 42,
potassium fluoborate, 23.

Another flux, No. 2, similar to Flux No. 1 in terms of properties has the following composition, wt.%:
boric acid, 70
calcium fluoride, 9
sodium tetraborate, 21.

Yet a third possible flux, Flux No. 3, has the following composition, wt.%:
boric acid, 20
sodium tetraborate, 80.

A further possibility, Flux No. 4, is a compound of the following composition, wt.%:
sodium fluoride, 10
zinc chloride, 8
lithium chloride, 32
potassium chloride, 50.

The soldering agent for joining metals with metallized materials on the basis of diamond and cubic boron nitride has the following composition, wt.%:
copper, from 13 to 60
tin, from 5 to 15
titanium, from 5 to 25
and, in accordance with the invention,
lead, from 2 to 15,
the balance being constituted by molybdenum and/or tungsten or tantalum.

An alternative, and equally effective, soldering agent has the following composition, wt.%:
copper, from 13 to 60
tin, from 5 to 15
titanium, from 5 to 25
solder-insoluble non-metallic filler, from 0.5 to 20
molybdenum and/or tungsten or tantalum, from 0.3 to 20.

The non-metallic filler is a powder of grain size from 1 to 50 microns.

The invention will be further understood from the following concrete examples.

EXAMPLE 1

A polycrystal of a cubic modification of boron nitride such as Elbor of diameter 3.9 mm and height 4.4 mm and a steel holder of diameter 5 mm and height 20 mm are to be soldered together.

The boron nitride polycrystal is premetallized with a chromium layer by electron-beam sputtering of the metal and its deposition to a layer thickness of 0.001 mm, the procedure being effected in a vacuum of 1 to 5 $\cdot 10^{-5}$ mm Hg. Then the polycrystal is given a protective coat of copper chemically deposited to a thickness of 0.005 mm. The coating components are in the weight ratio of 20 chromium to 80 copper. Then the semicrystal is subjected to baking under vacuum (2 to 5 $\cdot 10^{-5}$ mm Hg) at 950° C for 20 minutes. The metallized polycrystal is placed in a prepared cylindrical bore hole formed in the end face of the holder along the axis thereof, the solder slit being 0.15 mm on a side.

The soldering procedure is effected in air under a layer of Flux No. 1 by high-frequency heating with a soldering agent comprising 20 percent by weight of tin and 80 percent by weight of copper at a heating cooling rate of 20 deg/sec. The process is carried on at a temperature of 900° C for 1.5 minute. The solder melts down and, by the action of capillary forces, flows into the solder slit.

The soldered joint is even, free from cavities and cracks in the cutting element as well as from other soldering flaws; the adhesion of the soldering agent to the polycrystal is satisfactory.

EXAMPLE 2

An Elbor polycrystal of diameter 4.2 mm and height 4.6 mm and a steel of diameter 5.5 mm and height 20 mm are to be soldered together.

The polycrystal is premetallized with a 0.008-mm coating of chromium applied by chemical deposition. Then the polycrystal is given a protective coat of cobalt by metal sputtering under vacuum to a thickness of 0.005 mm. The weight ratio of the components is 15 chromium to 85 cobalt. The metallizing coating is subjected to vacuum baking at 1 to 5 $\cdot 10^{-5}$ mm Hg and 950° C for 30 minutes. The metallized polycrystal is placed in a prepared cylindrical bore hole formed in the end face of the steel holder along the axis thereof, the solder slit being 0.10 on a side.

The soldering procedure is effected in air under a layer of Flux No. 2 by high-frequency heating with a solder made up of 20 percent by weight of tin and 80 percent by weight of copper at a heating and cooling rate of 30 deg/sec for 1 minute. The soldering temperature is 900° C. The soldering agent melts down and, by the action of capillary forces, flows into the solder slit.

The resultant soldered joint is even and free from cavities and cracks in the cutting element as well as from other soldering flaws; the adhesion of the soldering agent to the polycrystal is adequate.

EXAMPLE 3

A polycrystal on the basis of synthetic diamond Carbonado of diameter 3.5 mm and height 4.6 mm and a steel holder of diameter 5 mm and height 20 mm are to be soldered together.

The Carbonado polycrystal is premetallized with a coat of tantalum by vacuum sputtering to a thickness of 0.0005 mm and then given a 0.01 mm coat of silver applied by the same method. The weight ratio of the coating components is 3 tantalum to 97 silver. The metallizing coating is baked in a vacuum of 1 to $5 \cdot 10^{-5}$ mm Hg at 900° C for 15 minutes. The metallized polycrystal is placed in a prepared cylindrical bore hole formed in the end face of the holder along the axis thereof, the solder slit being 0.10 mm on a side.

The soldering procedure is effected in air under a layer of Flux No. 3 by high-frequency heating with a solder made up of 28 percent by weight of copper and 72 percent by weight of silver at a heating and cooling rate of 30 deg/sec at 800° C for 0.7 minute. The solder melts down and, by the action of capillary forces, flows into the solder slit.

The resultant soldered joint is even and free from cavities and cracks in the cutting element as well as from other soldering flaws; the adhesion of the solder to Carbonado is adequate.

EXAMPLE 4

An Elbor polycrystal of diameter 4.1 mm and height 4.5 mm and a steel holder of diameter 5.5 mm and height 20 mm are to be soldered together.

The polycrystal is premetallized with a coat of tantalum by metal sputtering under vacuum to a thickness of 0.001 mm and then with a coat of nickel by the same technique to a thickness of 0.005 mm. The weight ratio of the coating components is 20 tantalum to 80 nickel. The metallizing coating is baked in a vacuum of 1 to $5 \cdot 10^{-5}$ mm Hg at 1,000° C for 30 minutes. Then the metallized polycrystal is placed in a prepared cylindrical bore hole formed in the end face of the holder along the axis thereof, the solder slit being 0.20 mm on a side.

The soldering procedure is effected in air under a layer of Flux No.4 by high-frequency heating with a solder made up of 20 percent by weight of tin and 80 percent by weight of copper at a heating and cooling rate of 30 deg/sec for 1 minute. The soldering temperature is 900° C. The solder melts down and, by the action of capillary forces, flows into the solder slit.

The resultant soldered joint is even and free from cavities and cracks in the cutting element as well as from other soldering flaws; the adhesion of the solder to Elbor is satisfactory.

EXAMPLE 5

An Elbor polycrystal of diameter 4.0 mm and height 4.4 mm and a steel holder of diameter 5.0 mm and height 20 mm are to be soldered together.

The polycrystal is premetallized with a coat of molybdenum by vacuum sputtering to a thickness of 0.001 mm and then with a coat of lead applied by the same method to a thickness of 0.005 mm. The weight ratio of the coating components is 10 molybdenum to 90 lead. The metallizing coating is baked in a vacuum of 1 to $5 \cdot 10^{-5}$ mm Hg at 700° C for 10 minutes. Then the metallized polycrystal is placed in a prepared cylindrical bore hole formed in the end face of the holder along the axis thereof, the solder slit being 0.10 mm on a side.

The soldering procedure is effected in air under a melt of Flux No. 2 by high-frequency heating with a soldering agent comprising 15 percent by weight of tin and 85 percent by weight of copper at a rate heating and cooling rate of 2a deg/sec for 1.5 minute. The soldering temperature is 920° C. The soldering agent melts down and, by the action of capillary forces, flows into the solder unit.

The resultant soldered joint is even and free from cavities and cracks in the cutting element as well as from other soldering flaws; the adhesion of the soldering agent to Elbor is adequate.

EXAMPLE 6

A Carbonado polycrystal of diameter 3.7 mm and height 4.7 mm and a steel holder of diameter 5 mm and height 20 mm are to be soldered together.

The Carbonado polycrystal is first metallized with a coat of molybdenum applied by vacuum sputtering to a thickness of 0.001 mm and then with a coat of copper to a thickness of 0.01 applied by electrolytic deposition. The weight ratio of the coating components is 30 molybdenum to 70 copper. The metallizing coating is baked in a vacuum of 1 to $5 \cdot 10^{-5}$ mm Hg at 700° C for 30 minutes. Then the metallized polycrystal is placed in a prepared cylindrical bore hole formed in the end face of the holder along the axis thereof, the solder slit being 0.15 mm on a side.

The soldering procedure is effected in air under a melt of Flux No.3 by high-frequency heating with a solder comprising 28 percent by weight of copper and 72 percent by weight of silver at a heating and cooling rate of 30 deg/sec for 0.7 minute. The soldering temperature is 800° C. The solder melts down and, by the action of capillary forces, flows into the solder slit.

The resultant soldered joint is even and free from cavities and cracks in the cutting element as well as from other soldering flaws; the adhesion of the solder to Carbonado is satisfactory.

EXAMPLE 7

An Elbor polycrystal of diameter 4.1 mm and height 4.5 mm and a steel holder of diameter 5.5 mm and height 20 mm are to be soldered together.

The polycrystal is premetallized with a coat of tungsten by vacuum sputtering to a thickness of 0.001 mm and then with a coat of copper similarly applied. The weight ratio of the coating components is 20 tungsten to 80 copper. The metallizing coating is baked in a vacuum of 1 to $5 \cdot 10^{-5}$ mm Hg at 1,000° C for 30 minutes. The metallized polycrystal is placed in a prepared cylindrical bore hole formed in the end face of the holder along the axis thereof, the solder slit being 0.20 mm on a side.

The soldering procedure is effected in air under a melt of Flux No.4 by high-frequency heating with a solder comprising 20 percent by weight of tin and 80 percent by weight of copper at a heating and cooling rate of 30 deg/sec for 1 minute. The soldering temperature is 900° C. The solder melts down and, by the action of capillary forces, flows into the solder slit.

The resultant soldered joint is even and free from cavities and cracks in the cutting element as well as from other soldering flaws; the adhesion of the solder to Elbor is adequate.

EXAMPLE 8

An Elbor polycrystal of diameter 4.1 mm and 4.5 mm and a steel holder of diameter 5.5 mm and height 20 mm are to be soldered together.

The polycrystal is premetallized with a coat of tungsten by vacuum sputtering to a thickness of 0.0001 mm and then with a coat of tin applied in a similar manner. The weight ratio of the coating components is 20 tungsten to 80 tin. The metallizing coating is baked in a vacuum of 1 to 5 · $10^{-5}$ mm Hg at 1,000° C for 30 minutes. The metallized polycrystal is placed in a prepared cylindrical bore hole formed in the end face of the holder along the axis thereof, the solder slit being 0.20 mm on a side.

The soldering procedure is effected in air under a melt of Flux No. 4 by high-frequency heating with a solder comprising 20 percent by weight of tin and 80 percent by weight of copper at a heating and cooling rate of 30 deg/sec for 1 minute. The soldering temperature is 900° C. The solder melts down and, by the action of capillary forces, flows into the solder slit.

The resultant soldered joint is even and free from cavities and cracks in the cutting element as well as from other soldering flaws; the adhesion of the solder to Elbor is adequate.

EXAMPLE 9

An Elbor polycrystal of diameter 4.1 mm and height 4.5 mm and a steel holder of diameter 6 mm and height 20 mm are to be soldered together.

The polycrystal is premetallized with a coat of an alloy having the following composition, wt.%:

6 Ti + 10 Pb + 11.5 Sn + 72.5 Cu + 1 Mo, applied in the form of a powder-like paste kneaded on the basis of an organic glue readily burning out under vacuum. The paste is applied with a brush to a thickness of 0.1 mm, whereupon the polycrystal is baked in a vacuum of 1 to 5 · $10^{-5}$ mm Hg at a temperature of 900° C for 5 minutes. The metallized polycrystal is placed in a prepared cylindrical bore hole formed in the end face of the holder along the axis thereof, the solder slit being 0.2 mm on a side. The soldering procedure is effected in air under a melt of Flux No.1 by high-frequency heating with a solder comprising 19 percent by weight of tin, 78 percent by weight of copper and 3 percent by weight of nickel at a heating and cooling rate of 20 deg/sec. The solder melts down and, by the action of capillary forces, flows into the solder slit. The soldering temperature is 900° C.

The resultant soldered joint is even and free from cavities and cracks in the cutting element as well as from other soldering flaws; the adhesion of the solder to Elbor is adequate.

EXAMPLE 10

A Carbonado polycrystal of diameter 3.5 mm and height 4.2 mm and a steel holder of diameter 5.5 mm and height 20 mm are to be soldered together.

First, the Carbonado polycrystal is metallized with a coat of an alloy having the following composition, wt.%:

10 Ti + 12 Pb + 7 Sn + 68 Cu + 3 W.

The coating is applied by dipping the polycrystal in the melt in a vacuum of 1 to 5 · $10^{-5}$ mm Hg at a temperature of 900° C for 5 minutes to a coating thickness of 0.05 mm. The metallized polycrystal is placed in a prepared cylindrical bore hole formed in the end face of the holder along the axis thereof, the solder slit being 0.15 mm on a side. The soldering is effected in air under a melt of Flux No. 2 by high-frequency heating with a solder of the following composition, wt.%: copper, 70; iron, 0.1; lead, 0.03; bismuth, 0.002, antimony, 0.05; zinc being the balance. The heating and cooling rate is 30 deg/sec. The soldering temperature is 850° C. The solder melts down and, by the action of capillary forces, flows into the solder slit.

The resultant soldered joint is even and free from cavities and cracks in the cutting element as well as from other soldering flaws; the adhesion of the solder to Carbonado is adequate.

EXAMPLE 11

A Hexanite polycrystal of diameter 5.0 mm and height 5.1 mm and a steel holder of diameter 8 mm and height 20 mm are to be soldered together.

The Hexanite polycrystal is premetallized with a coat of an alloy having the following composition, wt.%:

8 Ti + 12 Pb + 11 Sn + 49 Cu + 20 Ta.

The alloy in the form of a powder-like paste kneaded on the basis of an organic glue readily burning out under vacuum, is applied with a brush to a thickness of 0.5 mm, and the polycrystal is then baked in a vacuum of 1 to 5 · $10^{-5}$ mm Hg at a temperature of 900° C for 10 minutes. The metallized polycrystal is placed in a prepared cylindrical bore hole formed in the end face of the holder along the axis thereof, the solder slit being 0.2 mm on a side.

The soldering procedure is effected in air under a melt of Flux No. 3 by high-frequency heating with a solder comprising 20 percent by weight of tin and 80 percent by weight of copper at a heating and cooling rate of 20 deg/sec. The solder melts down and, by the action of capillary forces, flows into the solder slit. The soldering temperature is 900° C.

The resultant soldered joint is even and free from cavities and cracks in the cutting element as well as from other soldering flaws; the adhesion of the solder to Hexanite is adequate.

EXAMPLE 12

An Elbor polycrystal 40 mm in diameter and 4.5 mm in height and a steel holder 55 mm in diameter and 20 mm in height are to be soldered together.

First, the Elbor polycrystal is metallized with a coat of an alloy having the following composition, wt.%:

6 Ti + 10 Pb + 10.5 Sn + 73.5 Cu + 0.3 Mo + 0.7 $Al_2O_3$.

The alloy in the form of a powder-like paste kneaded on the basis of an organic glue readily burning out under vacuum, is applied with a brush to a thickness of 0.2 mm, the grain size of the aluminum oxide powder being 1 micron. The polycrystal is then subjected to baking in a vacuum of 1 to 5 · $10^{-5}$ at a temperature of 900° C for 5 minutes. The metallized polycrystal is placed in a prepared cylindrical bore hole formed in the end face of the holder along the axis thereof, the solder slit being 0.2 mm on a side.

The soldering procedure is effected in air under a melt of Flux No. 1 by high-frequency heating with a solder comprising 20 percent by weight of tin and 80 percent by weight of copper at a heating and cooling rate of 20 deg/sec. The soldering temperature is 900° C. The solder melts down and, by the action of capillary forces, flows into the solder slit.

The resultant soldered joint is even and free from cavities and cracks in the cutting element as well as from other soldering flaws; the adhesion of the solder to Elbor is adequate.

EXAMPLE 13

A Carbonado polycrystal of diameter 3.6 mm and height 4.0 mm and a steel holder of diameter 5.5 mm and height 20 mm are to be soldered together.

First, the Carbonado polycrystal is metallized with a coat of an alloy of the following composition, wt.%:

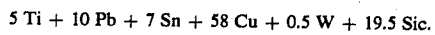

5 Ti + 10 Pb + 7 Sn + 58 Cu + 0.5 W + 19.5 Sic.

The powder-like alloy as a paste kneaded on the basis of an organic glue readily burning out under vacuum, is applied with a brush to a thickness of 0.3 mm, the grain size of the silicon carbide powder being 7 microns. Then the polycrystal is subjected to baking in a vacuum of 1 to $5 \cdot 10^{-5}$ mm Hg at a temperature of 900° C for 5 minutes. The metallized polycrystal is placed in a prepared cylindrical bore hole formed in the end face of the holder along the axis thereof, the solder slit being 0.15 mm on a side.

The soldering procedure is effected in air under a melt of Flux No. 2 by high-frequency heating with a solder of the following composition, wt.%: copper, 70; iron, 0.1; lead, 0.03; bismuth, 0.002; antimony, 0.05; the balance being zinc. The rate of heating and cooling is 30 deg/sec; the soldering temperature is 850° C. The solder melts down and, by the action of capillary forces, flows into the solder slit.

The resultant soldered joint is even and free from cavities and cracks in the cutting element as well as from other soldering flaws; the adhesion of the solder to Carbonado is adequate.

EXAMPLE 14

A Hexanite polycrystal of diameter 5.5 mm and height 5.3 mm and a metal holder on the basis of an iron-nickel-copper alloy in the form of a 15 mm × 15 mm plate of height 8 mm are to be soldered together.

The Hexanite polycrystal is premetallized with a coat of an alloy of the following composition, wt.%:

7 Ti + 12 Pb + 11 Sn + 49 Cu + 20 Ta + 1 Bn. The powder-like alloy in the form of a paste kneaded on the basis of an organic glue readily burning out under vaccuum, is applied with a brush to a thickness of 0.4 mm (the boron nitride powder has a grain size of 5 microns), and the polycrystal is subsequently baked in a vacuum of 1 to $5 \cdot 10^{-5}$ mm Hg at a temperature of 900°C for 10 minutes. The metalized polycrystal is placed in a prepared cylindrical bore hole formed in the side face thereof along the axis of the holder, the solder slit being 0.2 on a side.

The soldering procedure is effected in air under a melt of Flux No. 3 by high-frequency heating with a solder comprising 20 percent by weight of tin and 80 percent by weight of copper at a heating and cooling rate of 20 deg/sec. The soldering temperature is 900° C. The solder melts down and, by the action of capillary forces, flows into the solder slit.

The resultant soldered joint is even and free from cavities and cracks in the cutting element as well as from other soldering flaws; the solder adhesion to Hexanite is adequate.

What is claimed is:

1. A method for coating synthetic diamonds comprising coating said material with a metal melt comprising lead in an amount varying from 2 to 15% by weight, and a metal selected from the group consisting of chromium, molybdenum, tungsten, tantalum, and mixtures thereof; mixed with a metal selected from the group consisting of silver, or tin, and mixtures thereof.

2. A method for coating a material selected from the group consisting of boron nitride and synthetic diamonds, comprising:
    applying to the surface of said material a metallizing coating consisting essentially of a first layer of an adherent metal selected from the group consisting of chromium, molybdenum, tungsten, and tantalum; and a second layer of a metal of reduced oxidizability selected from the group consisting of silver, lead, and tin; wherein the adherent metal varies from 3 to 65 percent by weight of the metallizing coating.

3. The method of claim 2, wherein said material is boron nitride.

4. The method of claim 3, wherein the first layer of adherent metal is applied to a thickness of about 0.0005 to 0.001 mm, and the second metal layer of reduced oxidizability is applied to a thickness of about 0.001 to 0.01 mm.

5. The method of claim 2, wherein said material is synthetic diamonds.

6. The method of claim 5, wherein the first layer of adherent metal is applied to a thickness of about 0.0005 to 0.001 mm, and the second metal layer of reduced oxidizability is applied to a thickness of about 0.001 to 0.01 mm.

7. The method of claim 2, wherein said coated material is soldered with an alloy having a melting point under 1,000° C.

8. The method of claim 7, wherein said soldering is conducted at a temperature equal to the solder melting point for about 0.5 to 2 minutes at a rate of heating and cooling of the surfaces being joined of about 10 to 30 degrees per second by the use of a liquid flux having a melting point of about 500° to 700° C.

9. The method of claim 7, wherein said soldering procedure is effected under layer of liquid flux.

10. The method of claim 2, wherein said metallizing coating is applied by means selected from the group consisting of metal sputtering, electrolytic deposition, dipping in an adhesive melt, and a powder-like adhesive alloy paste.

* * * * *